UNITED STATES PATENT OFFICE.

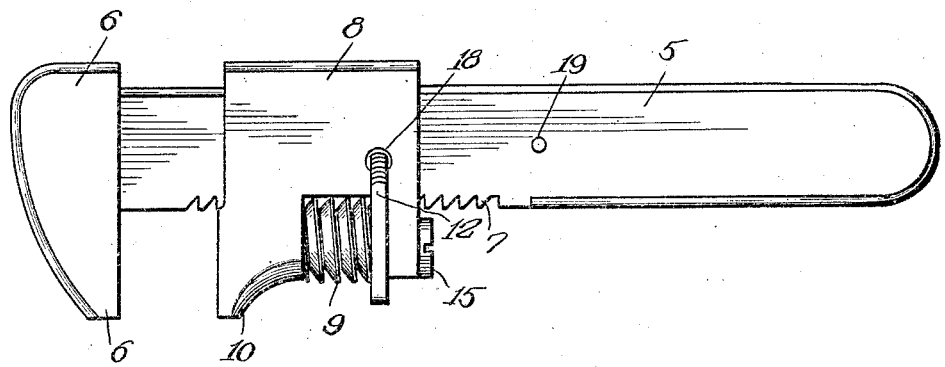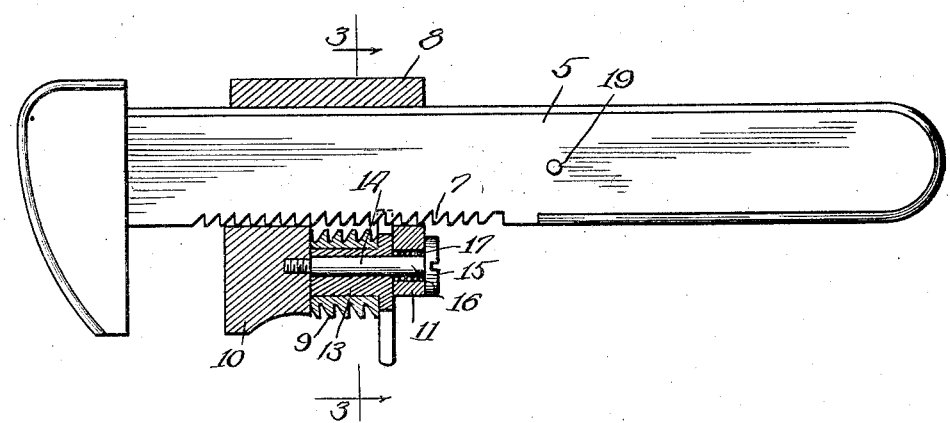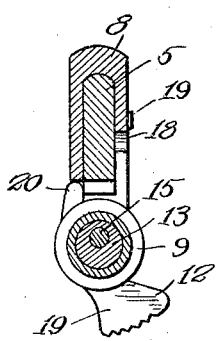

JOHN G. FURLAN, OF CHICAGO, ILLINOIS.

WRENCH.

1,362,413.   Specification of Letters Patent.   Patented Dec. 14, 1920.

Application filed June 7, 1920. Serial No. 387,161.

*To all whom it may concern:*

Be it known that I, JOHN G. FURLAN, a citizen of the United States, residing at Chicago, in the county of Cook and State of Illinois, have invented certain new and useful Improvements in Wrenches, of which the following is a specification.

This invention relates to improvements in wrenches.

One of the objects of the invention is to improve adjustable wrenches whereby to provide means for quick adjustment, for relatively extensive movement of the shiftable jaw, and supplementary means for moving the jaw in smaller gradations for more accurate adjustment.

Another object is to provide an improved means for unshipping the screw from engagement with the rack of the shank upon which the shiftable jaw is movable.

Another object is to provide a wrench in which all of the parts are strong, accurate and inexpensive to construct.

Other, further and more specific objects of the invention will become readily apparent, to persons skilled in the art, from a consideration of the following description when taken in conjunction with the drawings, wherein:—

Figure 1 is a side view of the wrench.

Fig. 2 is a similar view showing the shiftable jaw in section.

Fig. 3 is a section taken on line 3—3 of Fig. 2.

In all the views the same reference characters are employed to indicate similar parts.

5 is the shank of the wrench having on one end a fixed head, or jaw, 6. 7 is a rack cut into the edge of the shank with the teeth preferably inclined toward the fixed head so as to withstand the stress that may, in use, be imparted to the shiftable head 8. The screw 9 is provided with similar threads that engage the rack. The head 8 has a cut-away portion, between the parts 10 and 11, in which to include the screw 9 and the handle 12. The handle is a part of a sleeve 13 which is bored eccentrically to its axis, as at 14, for accommodation of the pivot screw 15. Around the shank 16 of the screw 15 is coiled a spring 17, which bears against the face of the handle 12 to produce some friction to restrain, to some extent, the rotary movement of the sleeve 13, so as to hold the parts in the operative positions in which they may be placed. A part is cut away from the shiftable jaw 8, as at 18, within which to receive the outstanding portion 19 of the handle 12 when the handle is rotated upon the axis 16.

When the parts are in positions shown in Fig. 2, with the screw laterally removed from the rack, the jaw may be freely moved along the shank 5 of the tool. A stop 19 prevents the shiftable jaw from leaving the shank. When the parts are in positions shown in Fig. 1, the screw 9 is in mesh with the rack 7 and the shiftable jaw 8 is in proper spaced-apart relation with the fixed jaw 6. Now, when it is desired to move the jaw 8 in smaller increments toward or from the jaw 6, the screw 9 may be rotated between the finger and thumb of the operator, without disturbing any adjustment effected by the operation of the handle 12. When the handle 12 is in the position shown in Fig. 3, the stop 20 engages one side of the shank 5 and prevents the handle from further movement in that direction so that the shiftable jaw 8 may be freely moved upon the shank 5.

The screw 9 is freely rotatable upon the sleeve 13 so that when the screw is in mesh with the rack it may be rotated to move the head 8 in either direction. The shank 5 also serves as a stop for the handle 12 when the latter is within the cut-away part 18 at which time the screw 9 is fully in meshing contact with the rack 7.

The handle 12 may readily be moved in either direction by the operator's thumb while he grasps the shank 5, and when the handle is moved into any position the spring 17 yieldingly holds it in the position into which it has been moved.

Having described my invention what I claim as new and desire to secure by Letters Patent is:—

1. A wrench having a shank with a fixed jaw and a rack in one edge thereof; a shiftable jaw on said shank having an opening to contain a screw for engagement with said rack; a rotatable screw in said opening; a rotatable sleeve in said screw provided with a handle radially extending therefrom, said sleeve having a bore eccentric to its true axis and a screw passing through said sleeve, and upon which said rack-engaging screw is laterally movable by operation of the handle.

2. A wrench having in combination a shank with a rack in one edge and a fixed jaw on one end, near the rack; a movable jaw, slidable on the rack and having an opening provided by a cut-away part to receive a jaw-moving screw; a jaw-moving screw in said opening; a sleeve within said cut-away part having a handle projecting radially therefrom on one side, and a stop to engage the shank from the other side, and having an eccentrically located axial bore; a screw passing through the bore of said sleeve and bridging the opening, and a spring bearing on said sleeve to yieldingly hold it in adjusted position.

In testimony whereof I hereunto subscribe my name.

JOHN G. FURLAN.